July 8, 1941.   C. J. CRETORS   2,248,812
CORN POPPING APPARATUS
Filed Oct. 6, 1938   5 Sheets-Sheet 1

Inventor:
Charles J. Cretors,
By Arthur W. Nelson
Attorney.

July 8, 1941.   C. J. CRETORS   2,248,812
CORN POPPING APPARATUS
Filed Oct. 6, 1938   5 Sheets-Sheet 2

Inventor:
Charles J. Cretors,
By: Arthur W. Nelson
Attorney.

July 8, 1941.  C. J. CRETORS  2,248,812
CORN POPPING APPARATUS
Filed Oct. 6, 1938   5 Sheets-Sheet 3

Inventor:
Charles J. Cretors,
By Arthur W. Nelson
Attorney.

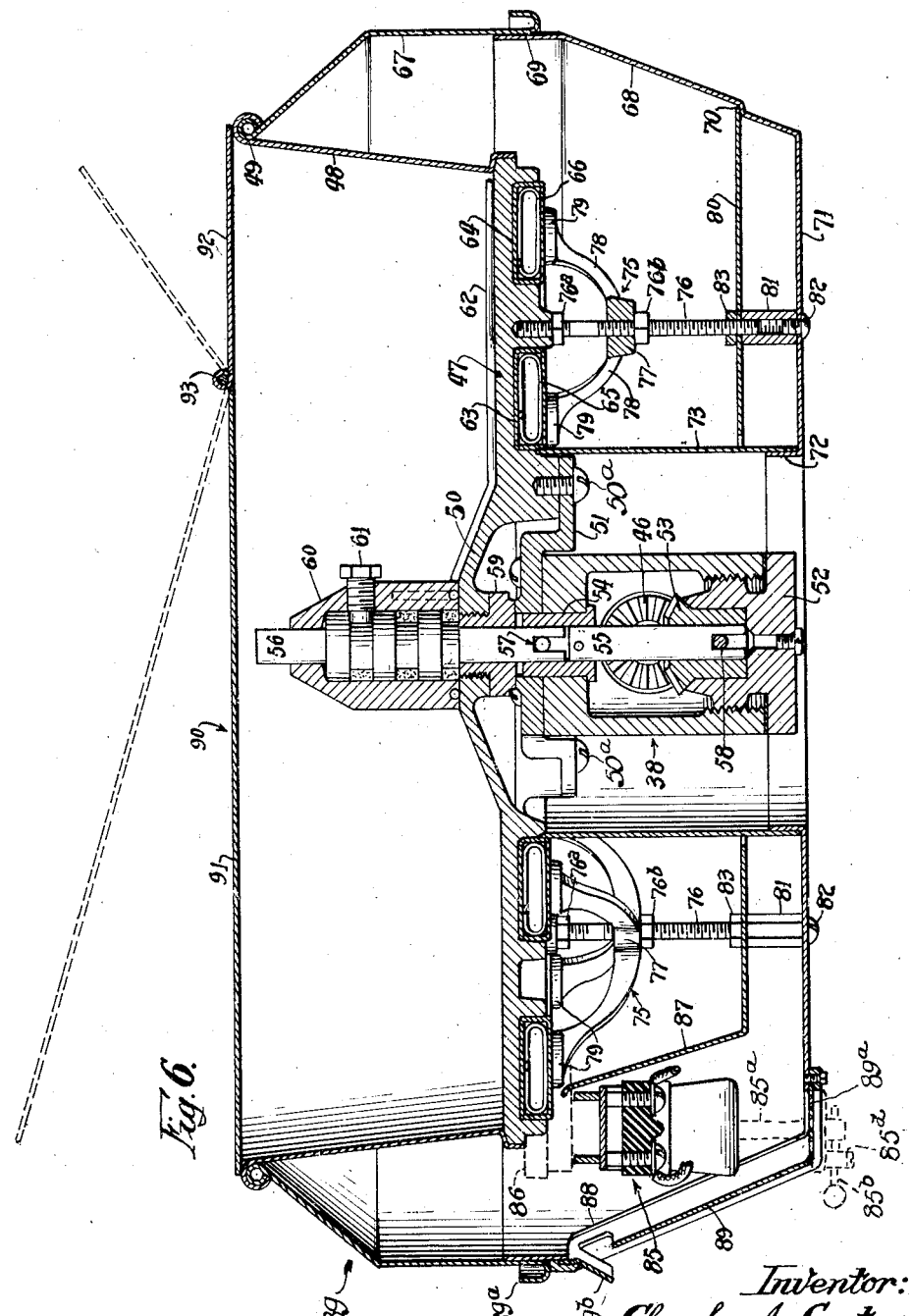

July 8, 1941.  C. J. CRETORS  2,248,812
CORN POPPING APPARATUS
Filed Oct. 6, 1938  5 Sheets-Sheet 5
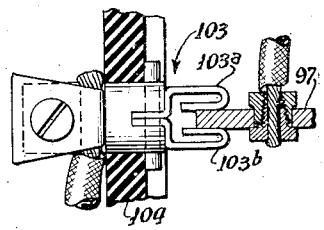
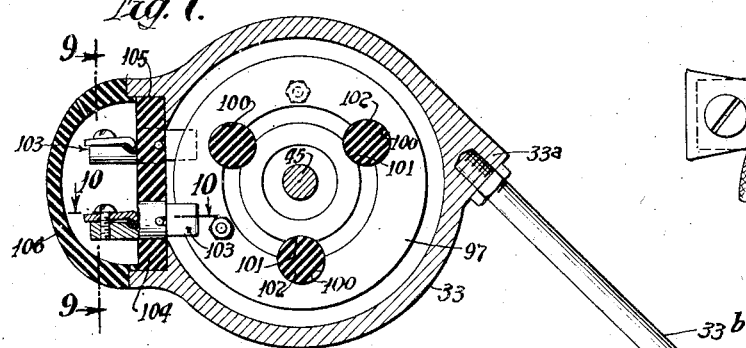
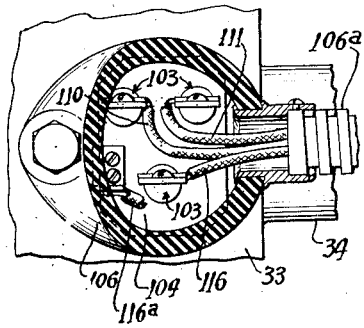
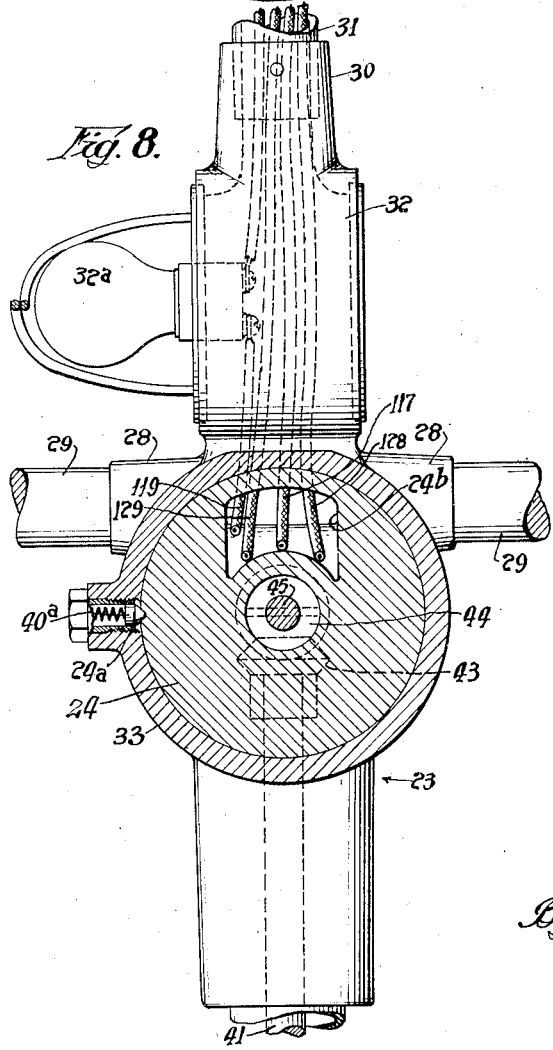
Inventor:
Charles J. Cretors,
By: Arthur W. Nelson
Attorney.

Patented July 8, 1941

2,248,812

UNITED STATES PATENT OFFICE 2,248,812

CORN POPPING APPARATUS

Charles J. Cretors, Chicago, Ill.

Application October 6, 1938, Serial No. 233,545

8 Claims. (Cl. 53—4)

This invention relates to improvements in corn popping apparatus and it consists of the matters hereinafter described and more particularly pointed out in the appended claims.

In apparatus with which the present invention is concerned, the temperature maintained at the bottom of the popping pan by the heating element is quite important. There is a best temperature range which gives the best results in popping corn. In substantially this range, the popped kernels are large and uniform in size so that not only the appearance of the batch is attractive, but the bulk yield is also increased. There is also a substantial absence of unpopped kernels in the popped batch. In temperatures above and below said range, the results vary. With popping temperature below said range, the popped kernels are irregular in size, with small kernels predominating. This reduces the bulk or volume of the batch and much waste occurs because of the unpopped kernels. With popping temperatures above said range, the yield in popped kernels is not only irregular, but the popped kernels are scorched or shriveled. This affects the flavor and appearance of the batch with a loss of volume therein.

Heretofore, the bottom of the popping pan has been relatively thin and the temperature varied between two extremes. Thus the pan bottom would get too hot at times. When the raw corn and the seasoning were placed in the pan they would absorb heat so rapidly that the pan bottom temperature was reduced to a degree below the range mentioned. Considerable time was, therefore, taken in raising the temperature to the popping range and this retarded operations.

Again, in a thin bottomed popping pan, the thermostat cannot follow the temperature changes at the bottom as quickly as they occur, so that the thermostat operated only between the two extremes of temperature, one above popping temperature and the other below that temperature. Therefore, the popped corn was not uniform in kernel sizes. Scorching occurred in the higher ranges and in the lower ranges many kernels remained unpopped. When either above or below the desired range, the bulk was less.

One of the objects of the present invention is to provide a construction in which the desired temperature range can be maintained throughout a greater part of the operating period whereby more popped corn of maximum size is obtained and whereby a greater volume of popped corn is also produced per unit of time.

Another object of the invention is to provide a pan structure for a cornpopping apparatus which is of such a thickness that after being charged with raw corn and seasoning, it will have sufficient residual heat so that the temperature of the pan bottom will not be reduced much, if any, below the popping temperature range, whereby operations will continue generally in the proper range, the thermostat operating primarily as a safety switch.

Still it is another object of the invention to provide a pan structure for an apparatus of this kind including novel means for feeding current to the heating elements, whereby it is possible to turn the pan in the same direction from popping position to dumping position and then to popping position.

Again, it is a further object of the invention to provide a novel lid for the popping pan wherein the lid portions are pivoted off center with respect to the pan, for a better display and spilling discharge of the popping corn, and for a quick emptying of the pan when turned or inverted from the popping position to the dumping position.

The above mentioned objects of the invention as well as others, together with the advantages thereof will more fully appear as the specification proceeds.

In the drawings—

Fig. 6 is a transverse vertical sectional view through the popping pan, as taken on the line 6—6 of Fig. 5.

Figures 3, 4:
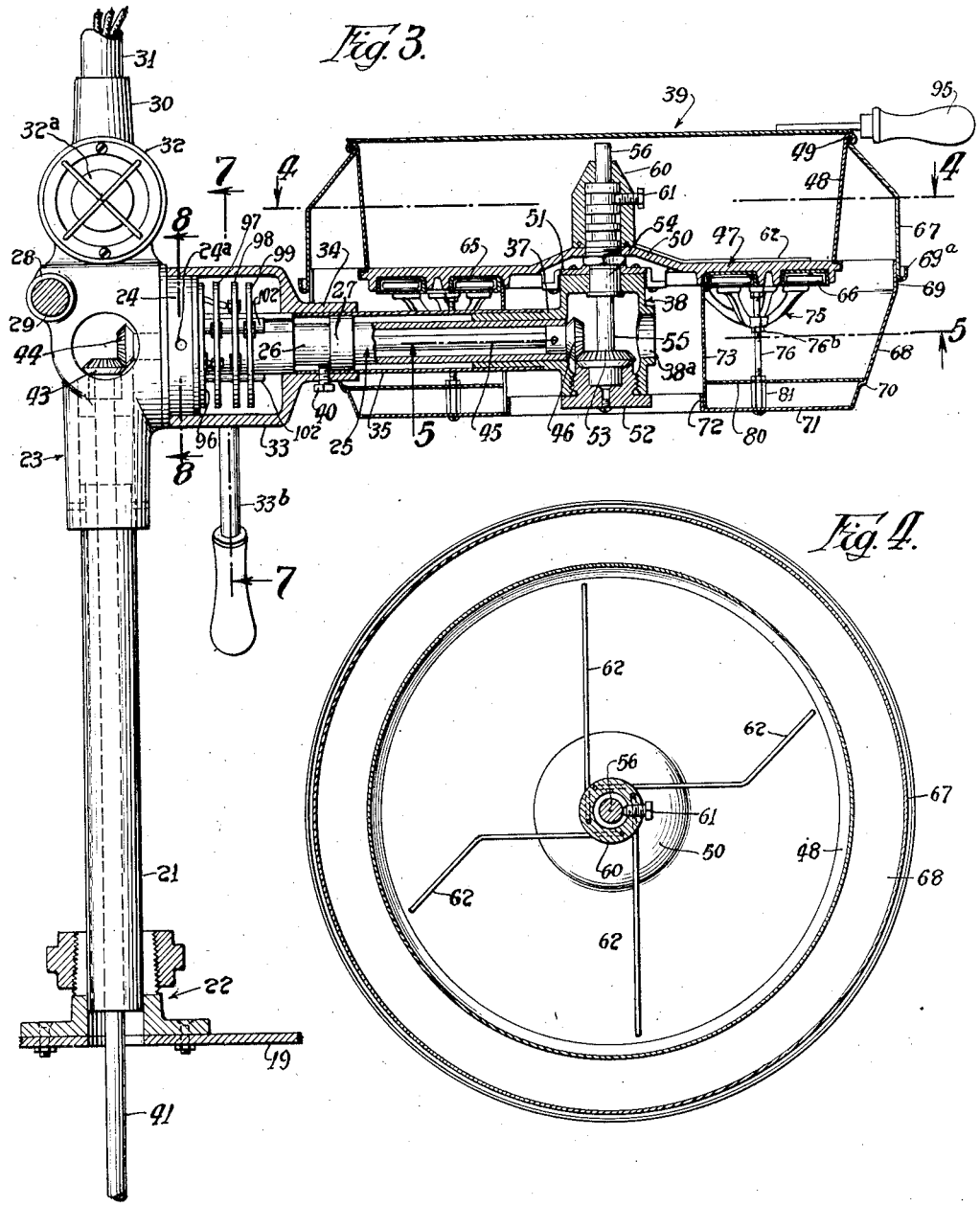
Fig. 3 is a vertical sectional view, on an enlarged scale, through the popping pan and illustrates the manner of supporting the same from the associated standard.
Fig. 4 is a horizontal section through the popping pan as taken on the line 4—4 of Fig. 3.
Figure 5:
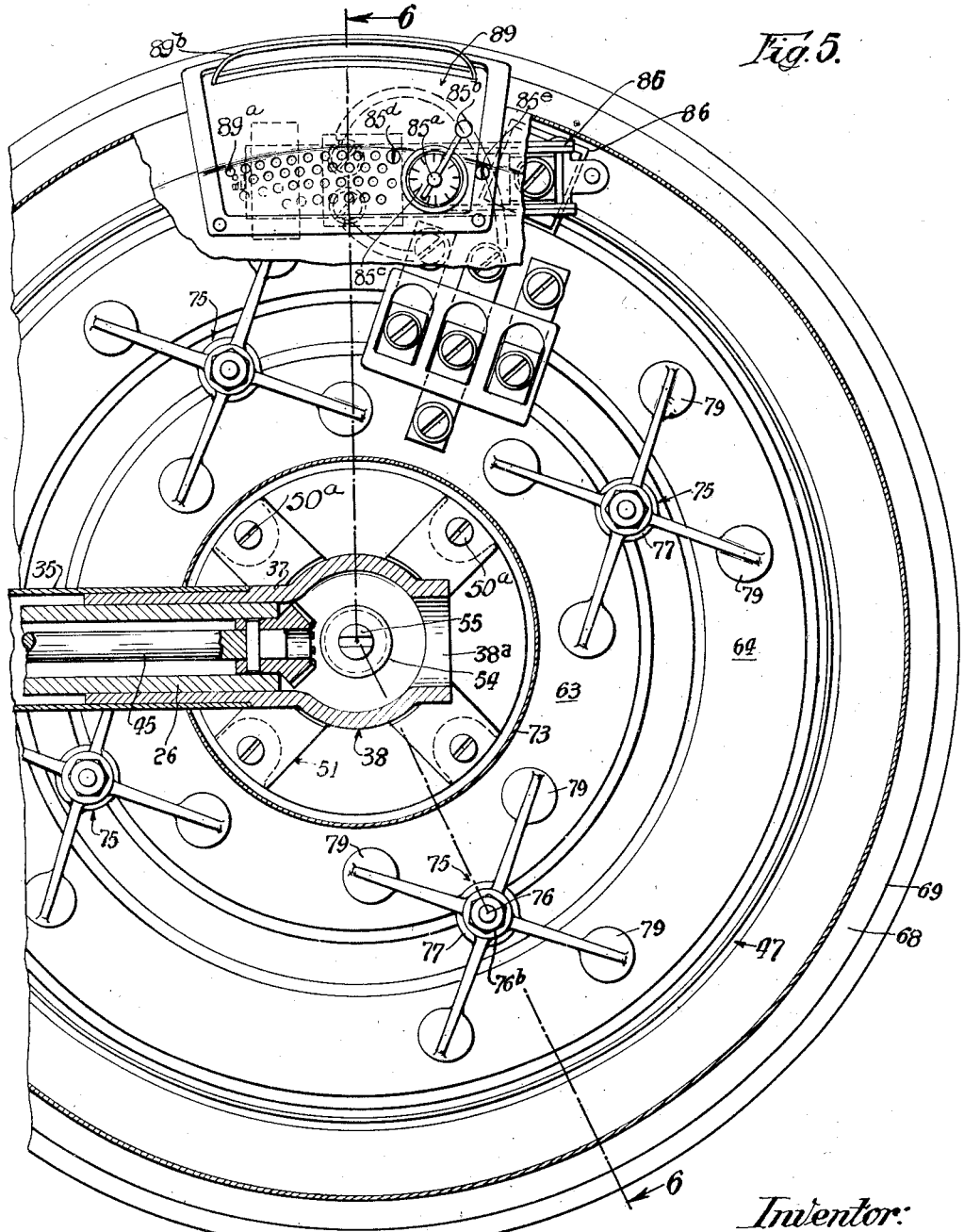
Fig. 5 is a horizontal sectional view through the popping pan, on an enlarged scale, as taken on the line 5—5 of Fig. 3.

Figs. 7 and 8 are vertical detail sectional views, on a further enlarged scale, as taken on the line 7—7 and 8—8 respectively of Fig. 3.

Figs. 9 and 10 are vertical detail sectional views as taken on the lines 9—9 and 10—10 respectively of Fig. 7.

Figure 1:
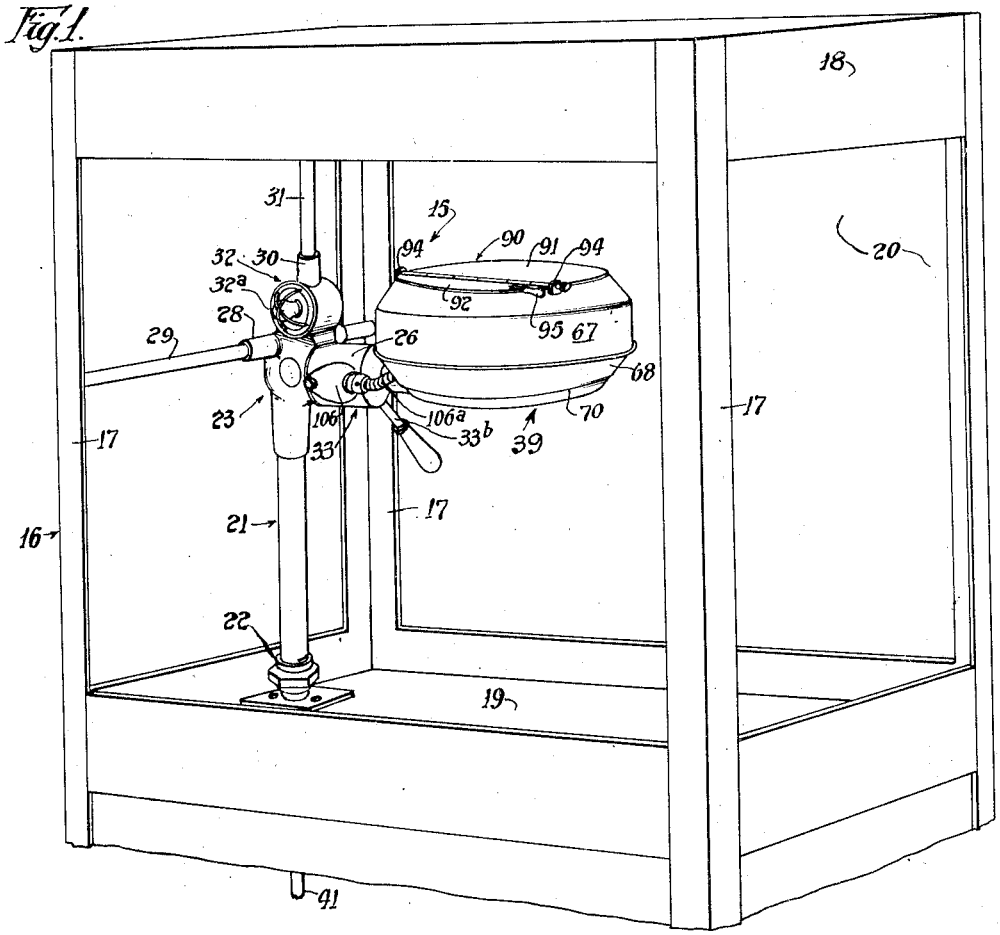
Fig. 1 is a perspective view of a corn popping apparatus embodying the preferred form of the invention, when disposed within an associated casing.

Referring now in detail to that embodiment of the invention illustrated in the drawings, 15 indicates the improved corn popping apparatus as a whole that is normally disposed within a casing 16, for display purposes and for sanitary reasons. The casing comprises a suitable frame that includes corner posts 17, a top 18, a floor 19 and glass sides and doors 20 disposed between said posts and said top and floor respectively, as appears in Fig. 1.

The apparatus 15 includes an upright tubular column or post 21 arranged toward one end of the casing and removably mounted at its bottom in a suitable chuck-like fitting 22 fixed to the floor 19. A hollow head 23 is fixed to the top end of the post 21 and which head includes a short horizontally extending boss 24 at one side. As shown in Fig. 3, said boss carries an axial tubular extension 25 having an inner end portion 26 of a larger diameter and spaced from said end portion is an annular collar or shoulder 27, the purpose of which will later appear.

On that side of the head opposite the boss 24 are oppositely extending hollow bosses 28 arranged at a right angle to the plane of the axis of the boss 24 and its tubular extension 25. The hollow bosses receive a brace rod 29 that is fixed at its ends to the posts 17 at one end of the casing as appears in Fig. 1. The head 23 also carries a top end hollow boss 30 in which one end of a tubular brace 31 is disposed. The other end of this brace is suitably fixed in the top 18 of the casing. The braces 29 and 31 hold the head 23 and the top end of the post 21 against lateral movement. The boss 30 includes a housing 32 in which is mounted a pilot light 32a whereby the operator can tell from afar whether or not the apparatus is in operation.

33 indicates a hollow housing that is journalled at its inner end upon the boss 24 and has a hub 34 at its outer end that is journalled upon the extension portion 26. A tube 35 is fixed at one end in the hub 34 and its other end internally receives the tubular extension 37 of a hollow head 36 for supporting a popping pan indicated as a whole as at 39. A set screw 40 is carried by the hub 34 of the housing 33 to engage behind the collar 27. This screw functions to hold the housing 33 and tube 35 against endwise displacement with respect to the head 23; but permits a rotation or turning movement of the housing 33, tube 35 and popping pan 39 as a unit about the axis of the tubular extension 25. In the boss 24 is a recess 24a to receive a spring pressed pin 40a which best appears in Fig. 8. By means of this spring pressed pin and its recess, the housing 33 is releasably held in a position corresponding to the popping position of the pan 39.

A shaft 41 (see Fig. 3) is journalled in the post or standard 21 and the bottom end thereof extends into the casing 16 below the floor 19 thereof, where it is operatively connected in driving relation to a motor 42 that appears diagrammatically in Fig. 2. A bevel gear 43 is fixed to the top end of said shaft within the head 23 and this gear meshes with a similar gear 44 also disposed in the head and mounted on one end of a shaft 45 arranged in the tubular extension 25. A similar gear 46 is fixed on the other end of the shaft 45 and is disposed within the hollow housing 38. The hub of the gear 46 is journalled in the associated end of the tubular extension 25 and the other end of the shaft 45 is journalled in the boss 24.

The pan 39 comprises a relatively heavy or thick, cast plate-like bottom 47 and an annular side wall 48 that is brazed at its bottom end to the peripheral edge of the bottom 47. This side wall which is made of relatively thin sheet metal, flares upwardly and outwardly toward the top to terminate in a rolled edge 49. With a brazed connection between the bottom and the side wall of the pan, there is a lesser degree of heat conductivity between said bottom and side wall than in a construction wherein they are integral. Therefore, the bottom does not lose so much of its heat to the side wall and better retains popping temperature. The plate like bottom has a raised central portion 50 which is detachably secured at its underside by screws 50a to a spider 51 fixed in supporting relation upon the top side of the housing 38 as appears in Fig. 6.

The bottom end of the housing 38 is closed by a removable bushing 52 in which is journalled the hub of an upwardly facing bevel gear 53 arranged in said housing and meshing with the gear 46 before mentioned. The top wall of the housing 38 and the central portion of the spider 51 coact to receive a bearing bushing 54 in which the top and bottom ends of a pair of shaft sections 55 and 56 are journalled, said shaft sections having a splined detachable clutch connection 57 within said bushing. The bottom end of the shaft section 55 has a pin and slot detachable connection 58 with the gear 53 as appears in Fig. 6. The shaft section 56 extends through a spacing bushing 59 carried by the pan bottom and arranged between the central portion 50 thereof and the spider 51, so as to be disposed within the pan proper. The hub 60 of an agitator is detachably secured to the top end of the shaft section 56 as by the screw 61. This hub carries a plurality of agitator arms 62 which best appear in Figs. 4 and 6 respectively.

In the underside of the plate-like bottom of the pan 39 is a pair of inner and outer annular channels 63 and 64 respectively in which are located the electrical heating elements or coils 65 and 66 respectively, which are held in place therein by means later to be described. It is apparent that when the coils or elements 65—66 are energized, they will heat the pan bottom 47 and that when the motor 42 is energized, it will drive the agitator arms 62. Due to the formation of the central portion 50 of the pan bottom it is apparent that the arms 62 in their rotation will always tend to move the unpopped corn kernels onto that part of the bottom 47 above the heating elements 65 and 66.

That portion of the pan bottom above the elements 65 and 66 and the side wall 48 of the popping pan is enclosed by a shell consisting of upper and lower sections 67 and 68 respectively, the meeting ends of said sections having an interfitting slip joint connection 69 as best appears in Fig. 6.

The bottom end of the upper section of the shell is formed to provide a normally upwardly opening gutter 69a extending circumferentially about the mid portion of the shell. In charging the pan with raw corn and the fluid-like seasoning, should some of the seasoning be accidentally spilled upon the shell, it runs down the outside of the shell section so as to be caught by the cutter. Thus, at no time can the spilled seasoning work in through the slip joint connection 69 into the interior of the shell, when the pan is inverted for dumping, and therefore no seasoning can reach the element sheeting to burn through and short circuit and which would render the element inoperative. As no seasoning can reach the elements, there is no smoking so that the inside of the shell remains clean and sanitary.

The upper part of the upper section is connected to the upper end of the side wall of the pan by the rolled edge 49. The lower section has an annular shoulder 70 formed therein and has an annular bottom wall 71 that includes a central upturned flange 72 of a diameter approximating that of the spider 51. A sleeve 73 is provided between the pan bottom 47 at a point just outside the spider 51 and the flange 72 and which parts coact to form an open bottom chamber at the central bottom portion of the popping pan as a whole, and in which the hollow head 38 is disposed. As shown in Fig. 3, said hollow head has an opening 38a therein whereby the interior thereof is open to atmosphere. This maintains the interior of said head and the gears 46 and 53 therein relatively cool.

The heating units 65 and 66 are removably secured in the channels 63 and 64, in good heating engagement with the bottom 47 of the popping pan by a plurality of spiders 75. Each spider is mounted on a perpendicular post 76 that has a screw threaded engagement at its top end and depends downwardly from portions of the pan bottom 47 at points between the channels 63 and 64 therein. A lock nut 76a is threaded on each post to engage said bottom 47 whereby the post is rigidly fixed to said bottom as best appears in Fig. 6. Each spider comprises a hub 77 and arms 78 radiating upwardly and outwardly therefrom, with a foot 79 on each arm. A pair of the feet of each spider is engaged with a heating element 65—66 and a nut 76b is threaded on each post. When said nuts are drawn up tight, this forces the spider upwardly and exerts an upward pressure on the feet of the spiders which holds the elements 65 and 66 snugly in their channels 63 and 64 and in intimate heating engagement with the pan bottom 47.

The posts 76 extend down through a reflector plate 80 that rests at its outer margin upon the shoulder 70 of the shell section 68. A nut 81 is threaded on each post and which nuts serve as spacers between the bottom wall 71 of the shell section and the reflector plate. A screw 82 passes through the bottom wall 71 from below and is threaded into the nut 81 and a lock nut 83 is threaded on the post to engage the top surface of the reflector plate. It is apparent from the above that the screws 82 removably hold the bottom section 68 of the shell in operative position. Should one of the elements 65—66 require replacement, the shell section 68 and the reflector plate 80 are first removed, after which the screws 50a are removed, to detach the pan bottom 47 from the spider. With the pan bottom turned upside down, the elements are exposed for easy removal and replacement. The manner of replacing the parts mentioned is obvious.

Within the bottom section of the shell, at one side of the pan as a whole, in a plane at a right angle to the plane of the shaft 45 is located a two stage thermostat 85 of a conventional construction for controlling the temperature range produced by the elements 65—66. This thermostat is suitably supported from a laterally extending lug 86 on the pan bottom 47 and a part 87 of the reflector plate 80 is turned upwardly as appears in Fig. 6 whereby the thermostat is shielded from the adjacent portions of the elements 65—66. That side of the bottom section of the shield adjacent the thermostat is formed as an opening 88 that is covered by a removable plate 89 which provides a ventilator for the thermostat.

The bottom of said plate 89 has openings 89a therein and the side of said plate has a louvered opening 89b therein. The thermostat 85 has a setting stem 85a that extends down through the bottom of the plate 89 where it is provided with an actuating handle or lever 85b cooperating with a dial 85c. The lever 85b is arranged to engage either of two stops 85d and 85e which corresponds to the stages of the control operations of the thermostat 85.

The popping chamber of the pan as provided by the bottom 47 and side wall 48 is provided with a cover plate or lid indicated as a whole as at 90. This cover plate comprises a large plate-like section 91 and a smaller plate-like section 92 that are hingedly connected together by a pin 93 along a line off center with respect to the center of the pan as best appears in Fig. 6. The pin 93 is journalled at its ends in ears 94 (see Fig. 1) rising from the bead 49 and a handle 95 is secured to the smaller section of the lid or cover.

With such an off center cover or lid, when the corn is popping and increases in bulk, it lifts the lid sections to flow out of the pan onto the floor 19 of the casing 16 and makes for a better display. When the pan is inverted or turned from its popping to its dumping position, as will later appear, this off center lid construction opens automatically for quicker and more positive dumping of the popped corn.

When the pan has been turned in one direction as to dumping position, both lid sections hang downwardly in full open position. If the pan is turned in the same direction back to popping position, the lid section 91 automatically closes with the lid section 92 folded back upon the lid section 91 so that the pan is ready for charging with corn and seasoning for the next popping operation. The lid section 92 is then swung into its closed position by means of the handle 95. If the pan is turned in an opposite direction, back to popping position, the lid section 92 closes down upon the pan and the lid section 91 is folded back upon the lid section 9. This also leaves the pan open for charging. After charging, the lid section 91 is moved into its closed position. This may be done by lifting up on the handle 95 which, through the lid section 92, throws the lid section 91 into its closed position, after which the lid section 92 is returned to its closed position and the pan is ready for its popping operation. By reason of the handle, the lid section 92 may be manipulated without the danger of burning the fingers.

As before mentioned, the spring pressed plunger 40a engages in the recess 24a of the boss 24 to yieldingly hold the pan in popping position wherein the open top of the popping pan is uppermost. To swing the popping pan into its dumping position, the housing 33 is provided at one side with a tangentially disposed boss 33a in which an operating lever 33b is engaged.

In the housing 33 is provided a plurality of collector rings numbered 96—97—98 and 99 respectively, see Fig. 3 and which are spaced longitudinally of the extension portion 26 and suitably insulated therefrom. These rings have center openings of a diameter greater than that of the extension portion 26 and opening into each center opening is a plurality of recesses 100, arranged in line with longitudinal recesses 101 in the extension portion 26, as best appears in Fig. 7. Cylindrical members 102 of insulation material are disposed in these recesses. These members 102 not only support the rings from the extension 26 but they hold said rings against rotation and endwise movement thereon.

Each collector ring has a collector brush 103 associated therewith as best appears in Fig. 10, and all of these brushes are supported by means of a disk of insulation 104 located in a shouldered recess 105 formed as a part of the housing 33. A removable cap 106 closes this recess as best appears in Fig. 7. Each brush 103 is of a duplex character in that as best shown in Fig. 10, it includes a pair of spring contact fingers, 103a, 103b engaged with opposite sides of the peripheral margins of the associated collector ring. It is apparent that when the lever 33b is swung in one direction, this swings the popping pan from the popping position to the dumping position and the housing 33 turns on the boss 24. This carries the collector brushes 103 therewith and these brushes turn with respect to the associated collector rings 96—97—98 and 99 and remain in electrical contact engagement therewith. By reason of this arrangement, the lever 33b may be swung further in the same direction to return the pan to popping position, the plunger 40 snapping into the recess 24a in the boss 24 at this time. If desired with the construction described, the lever 33b may be swung back in the opposite direction from dumping position to return the pan to popping position. Thus should the operator become confused as to which way to turn the lever 33b in bringing the pan from dumping to popping position, the lever may be swung in either direction and no damage can occur to the mechanism as there are no conductors to become twisted and possibly broken and shorted.

Figure 2:
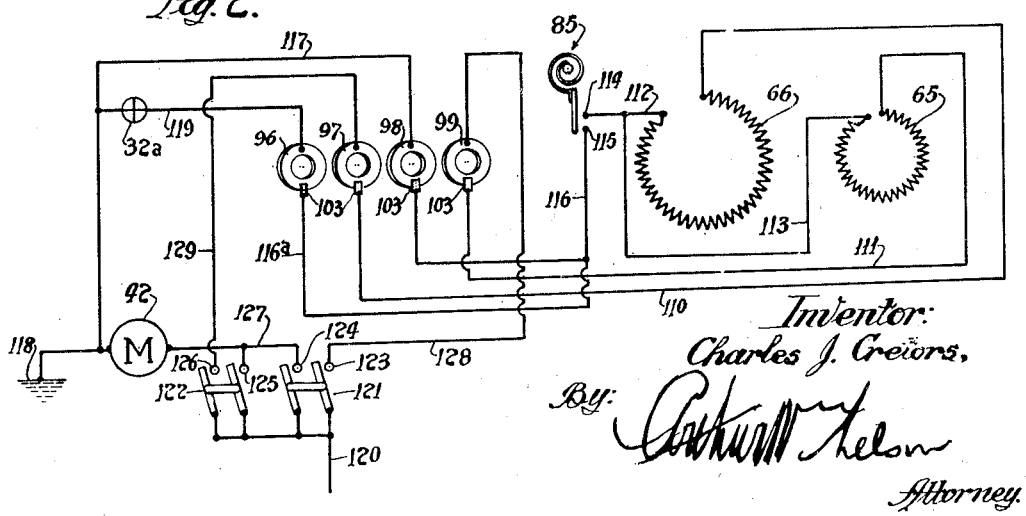
Fig. 2 is a diagrammatic view of one of the electrical circuits, which may be advantageously employed, for the driving motor, heating element and pilot light of the apparatus.

In Fig. 2 I have illustrated diagrammatically one form of circuit for the apparatus. In said figure it is apparent that the brushes 103 associated with the collector ring 97 and 99 respectively are connected by lines 110 and 111 respectively, each to one side of an associated heating element 66 and 65 respectively. The other sides of said elements are connected by lines 112 and 113 respectively to one of the contacts 114 of the thermostat, the other contact of which is indicated at 115. The contact 115 is connected by a line 116 to the brush 103 of the ring 98 and which ring is connected by a line 117 to ground that is indicated at 118. A branch 116a leads from the line 116 to the brush 103 associated with the ring 96 and a line 119 connects this ring to the line 117 so that the line 119 in effect leads to ground 118. The pilot light 32a is arranged in the line 119.

The current lead in line is indicated at 120 and a pair of two pole switches 121 and 122 are connected to said line. The arms of said switches are adapted to engage pairs of associated contacts 123—124 and 125—126 respectively and the contacts 124—125 are connected by a line 127 that leads to one side of the motor 42 the other side of which is grounded as appears in Fig. 2. The contact 123 is connected by a line 128 to the ring 99 and the contact 126 is connected by a line 129 with the ring 97.

When the switches 121 and 122 are open, the circuits for both elements 65—66, the motor 42 and the light 32a are open and deenergized. When the switch 121 is closed, this energizes one circuit for the motor from the line 120, through the switch 121, contact 124, line 127 to ground 118. This also closes a circuit from the line 120, through the switch 121 to contact 123 and through the line 128, ring 99, line 111 to one side of the element 65 out through the other side of the element to which the line 113 is connected to line 112 and contact 114. Assuming that the thermostat 86 is in that condition bridging the contacts 114 and 115, current flows through the line 116 to ring 98 and through the line 117 to ground 118. Current at this time also flows through the line 116 and branch 116a to the ring 96 and from there through the line 119 and light 32a to line 117 to ground 118.

Thus the motor 42 is in operation, the element 65 is energized to heat the pan bottom 47 and the light 32a is on to visibly show this condition to the operator. If more heat is desired for the pan bottom, the switch 122 may be closed so that current flows from the line 120 through the switch 122, contact 126, line 129 to the ring 97. It then follows through the brush 103 associated with said ring, through the line 110 to one side of the heating element and out through the other side through the line 112 to the contact 114. With the thermostat 85 closed so as to bridge the contacts 114—115, current flows through the line 116 to brush 103 associated ring 98 and then out through the line 117 to the ground 118. Of course, the motor 42 is still energized and the circuit for the light 32a is still closed.

Should the pan bottom 47 become too hot, then the thermostat 85 opens to break the circuit for both heating elements and the light 32a but the motor 42 will continue to run to drive the agitator 62 not only to keep the corn in motion for a popping of the unpopped kernels, but to prevent scorching of the popped kernels. So soon as the tempertaure of the pan bottom falls to a certain degree, the thermostat closes and the circuit for both heating elements and the pilot light are then closed.

With the arrangement described, it is possible to employ either of the heating elements 65—66 alone or jointly. Therefore, it is possible to obtain three different heating rates.

It is pointed out that should the corn in the pan be popped as an entirety, and it becomes necessary to dump the popping pan, the operator merely swings the lever 33b in either direction to turn the pan into dumping position. To return the pan to popping position, the lever may be turned either in the same direction or back in the other direction. In either case, the brushes 103 swing about the associated collector rings to maintain the circuits for the heating elements and the pilot light closed.

No matter how many times the lever is turned in the same direction, there are no wires to become twisted and therefore there can be no broken wires and resulting short circuits.

Assume that the operator is starting with a cold popping pan. By closing both switches and setting the lever 85b, this energizes the motor 42 and heating elements 65—66 so that the temperature of the pan bottom is quickly raised to popping temperature. At this time the raw corn and the seasoning may be placed in the pan. As this corn and seasoning is at only room temperature and relatively cool, it will quickly absorb heat units for popping purposes. With the pan bottom made relatively thick as before described, sufficient residual heat is in the pan bottom after the corn and seasoning has been placed in the pan to bring the temperature back to popping temperature almost immediately, thus operations are not delayed.

With the bottom and side of the pan enclosed in the shell, as before described, heat is conserved, and the bottom of the pan rises to popping temperature rapidly. Again, heat is conserved by means of the plate 80 which reflects heat back upon the pan bottom. This reflector plate however, is so positioned with respect to the heating elements that it will not concentrate the reflected heat directly on the heating elements so therefore they cannot become so hot as to burn out.

It is pointed out at this time that the conductor wires, leading to and from the various collector rings, are disposed in the hollow post 31 and enter the housing 33 through an opening 24b in the head as appears in Fig. 8. The wires for conducting current to and from the elements 65—66 lead off from the interior of the cap 106 through a hollow armored cable 106a that appears in Fig. 1.

The apparatus is foolproof, is capable of faster popping operations between corn and seasoning charging, and it assures a uniform popping of the corn with a material absence in culls or unpopped kernels at the end of each popping operation.

While in describing the invention, I have referred in detail to the form, arrangement and construction of the various parts thereof, the same is to be considered only in the illustrative sense so that I do not wish to be limited thereto except as may be pointed out in the appended claims.

I claim as my invention:

1. Corn popping apparatus embodying therein a popping pan having a bottom with a plurality of grooves in the underside thereof, heating elements in said grooves, members depending from said bottom, spiders disposed upon said members and having parts engaged with said elements, means on said members and engaged with said spiders for holding them in operative position with respect to said heating elements, and reflector means below said heating elements and supported by said members.

2. Corn popping apparatus embodying therein a popping pan having a bottom and a side wall, heating means in operative relation with the underside of said bottom, means providing an enclosing shell for said pan and having a bottom below said pan bottom, means depending from said pan bottom for supporting said shell, spiders arranged on said depending means and engaged with said heating means, for holding them in position with respect to said bottom, and a reflector plate between said spiders and shell bottom, said spiders and said reflector plate being supported from said depending means.

3. Corn popping apparatus embodying therein an open top popping pan that may be turned about a horizontal axis from a popping position to a dumping position and then to a popping position, a cover for said pan comprising a plurality of cover parts hingedly mounted with respect to each other and to the pan, one of said cover parts having an area greater than that of the other.

4. Corn popping apparatus embodying therein an open top popping pan that may be turned about a horizontal axis from a popping position to a dumping position and then to a popping position, a cover for closing said pan when in said popping position, said cover comprising at least two cover parts hingedly connected together and to the pan and off center with respect to the pan.

5. A corn popping apparatus embodying therein a popping pan, means providing a shell extending about the side of the pan and means providing an upwardly opening gutter on the outside of the shell.

6. In a corn popping apparatus the combination of a popping pan mounted for a tilting movement about a horizontal axis from a popping position to a dumping position and back to said popping position, and means providing a cover for said pan and comprising at least two cover parts pivotally connected together off-center of the pan and about a horizontal axis with respect to the pan and capable of independent swinging movement into and out of a closed position on said pan.

7. In a corn popping apparatus the combination of a popping pan mounted for tilting movement about a horizontal axis from a popping position to a dumping position and back to said popping position, and means providing a cover for said pan and comprising cover parts of different areas pivotally connected together off-center of the pan and about a horizontal axis with respect to the pan and capable of independent movement into and out of a closed position on said pan.

8. Corn popping apparatus embodying therein a popping pan having a relatively thin side wall and a thicker bottom, means beneath said bottom for heating the pan therethrough to a predetermined temperature within the popping temperature range, the thickness of said bottom being of such magnitude that upon charging the pan for a popping operation, it will retain that amount of heat therein which will prevent the pan from dropping to a temperature below said range whilst the heating means again restores the pan to higher temperature within said range, a shell enclosing said side and said bottom of the pan and providing an air space thereabout, means in said air space below said pan bottom and shielded from said heating means for controlling the application of heat to said pan bottom when the temperature substantially exceeds or falls below the desired temperature within said range, heat reflecting means in said air space and below and supported from said pan bottom, means also in said air space below said pan bottom for controlling the application of heat to said pan bottom when the temperature substantially exceeds or falls below the desired temperature in said range, means carried by said reflecting means for shielding said controlling means from the action of said heating means, and means providing for the passage of air through that part of the shell directly associated with said controlling means so as to provide a circulation of air about said controlling means.

CHARLES J. CRETORS.